E. P. BULLARD, Jr.
SPEED CHANGING MECHANISM.
APPLICATION FILED DEC. 22, 1911.
1,172,341.
Patented Feb. 22, 1916.
5 SHEETS—SHEET 1.
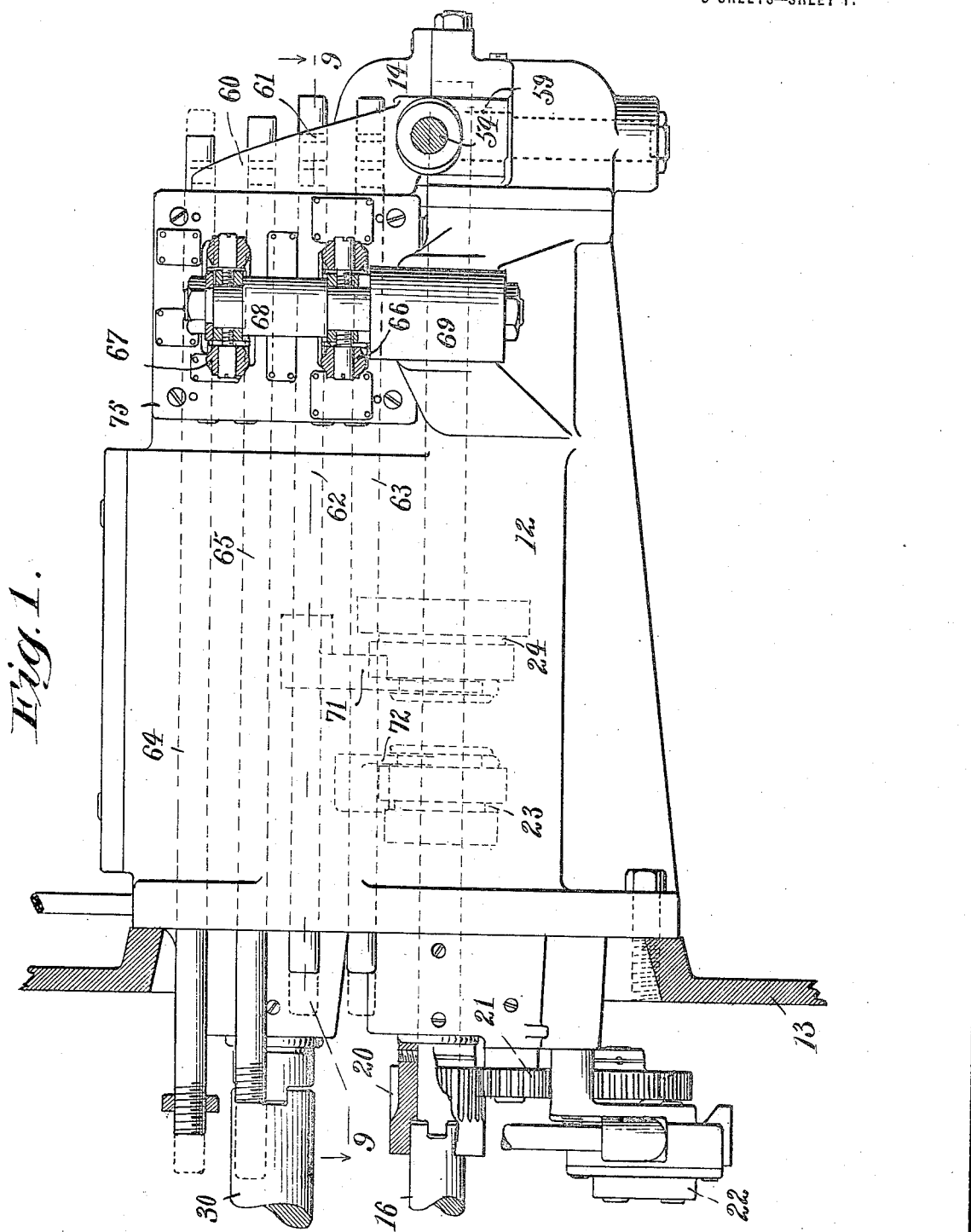
Witnesses
Ivan L. Morehouse
Ruth M. Worden
Inventor
Edward P. Bullard Jr.
By Chamberlain & Newman
Attorneys

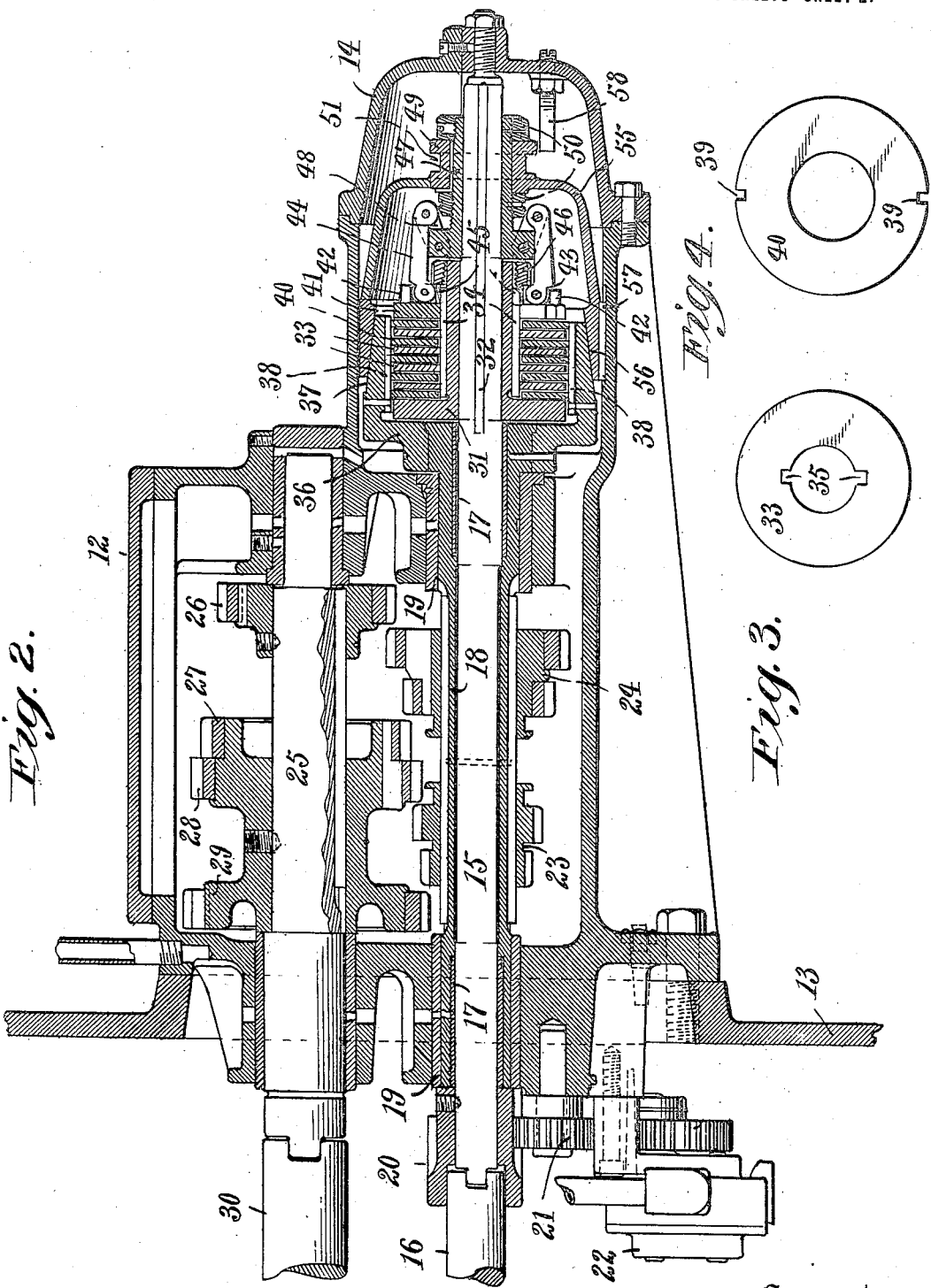

E. P. BULLARD, Jr.
SPEED CHANGING MECHANISM.
APPLICATION FILED DEC. 22, 1911.
1,172,341.
Patented Feb. 22, 1916.
5 SHEETS—SHEET 3.
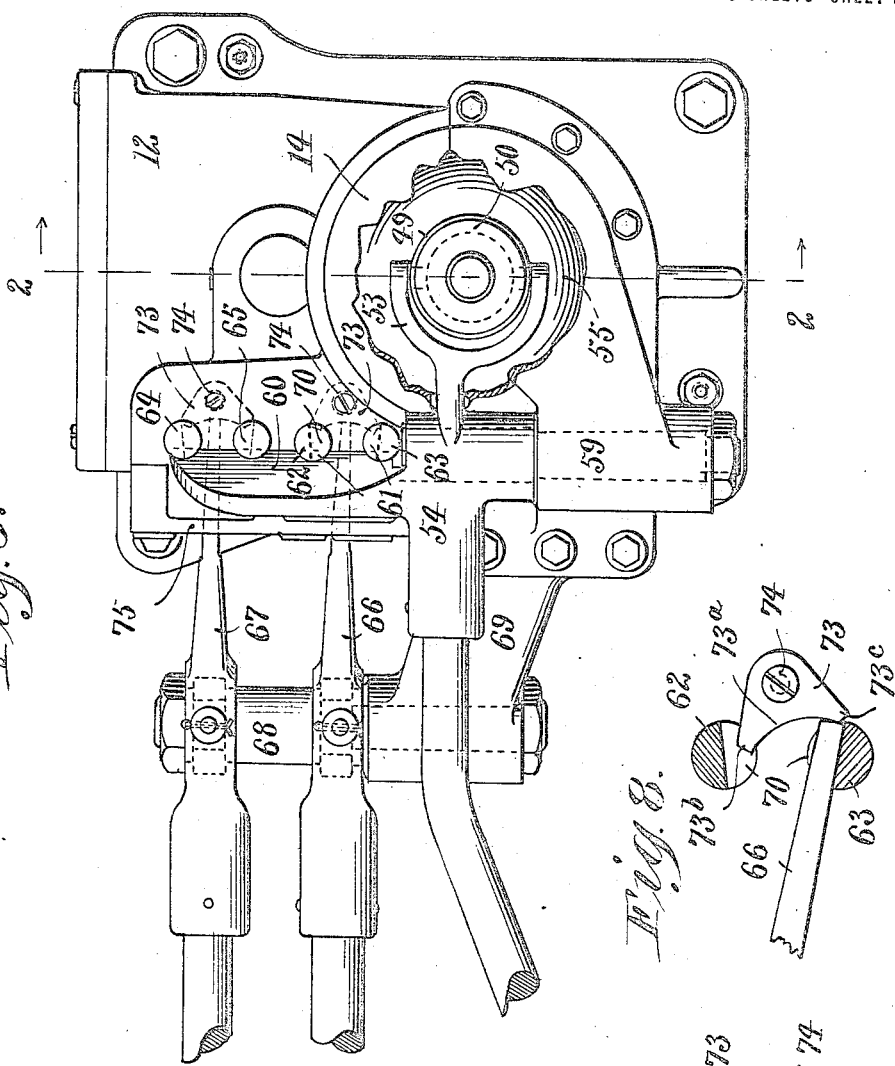
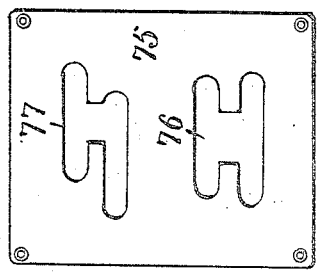
Witnesses
Joan L. Morehouse
Ruth M. Worden
Inventor
Edward P. Bullard Jr.
By Chamberlain & Newman
Attorneys

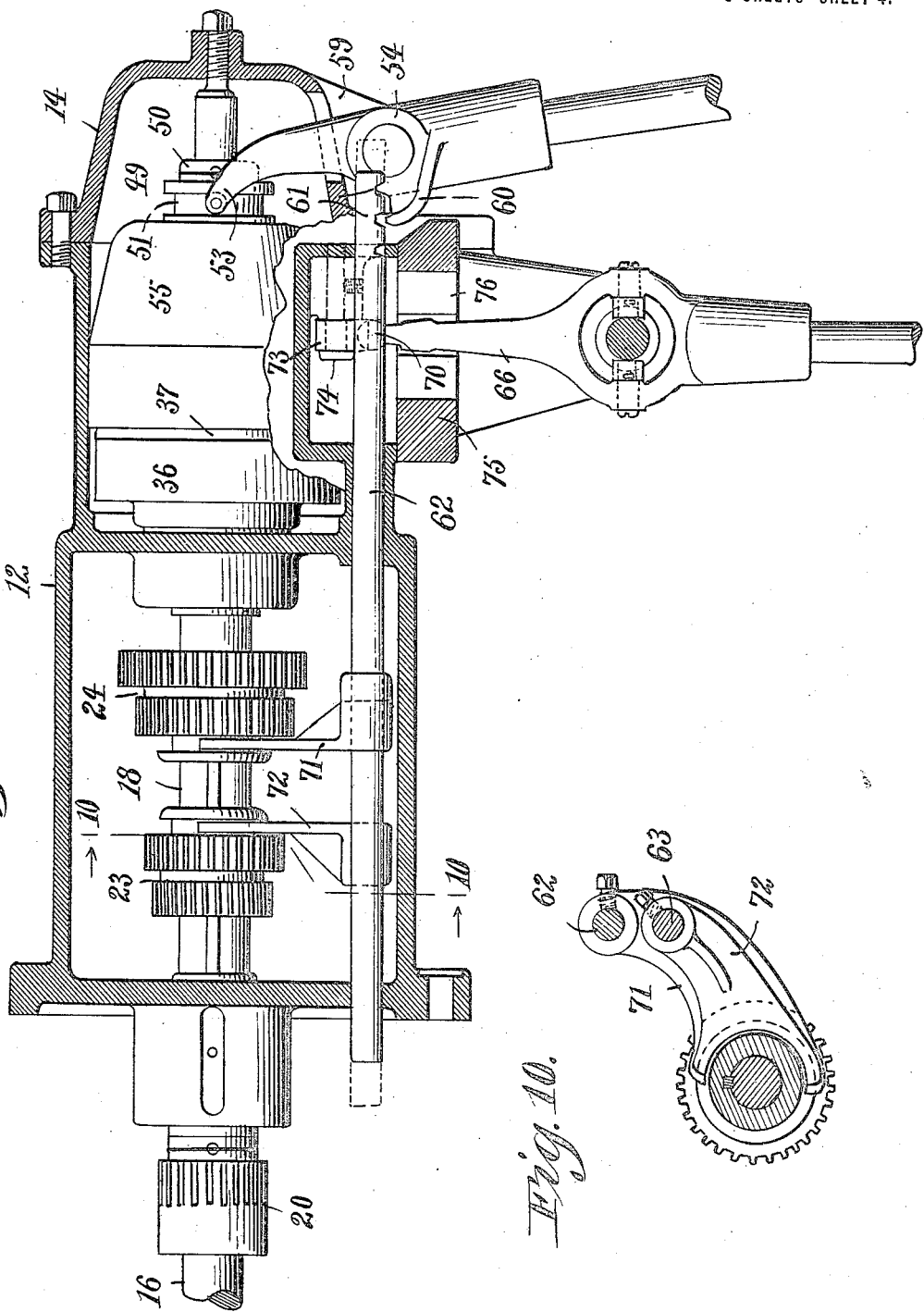

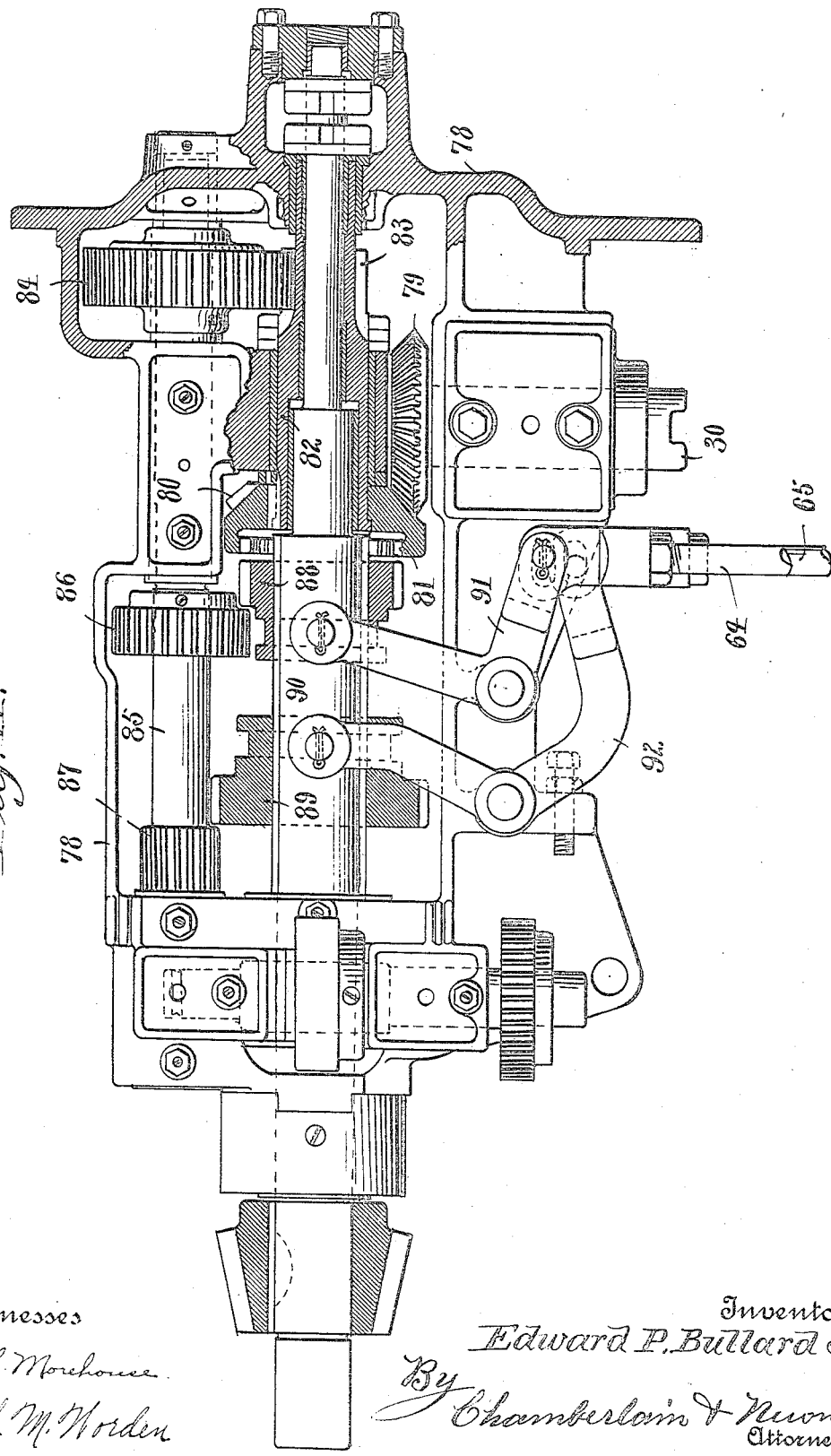

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

SPEED-CHANGING MECHANISM.

1,172,341. Specification of Letters Patent. Patented Feb. 22, 1916.

Application filed December 22, 1911. Serial No. 667,293.

*To all whom it may concern:*

Be it known that I, EDWARD P. BULLARD, Jr., citizen of the United States, and resident of Bridgeport, in the county of Fairfield and State of Connecticut, have invented certain new and useful Improvements in Speed - Changing Mechanism, of which the following is a specification.

My invention relates to improvements in speed changing mechanisms and interlocking means, whereby various changes of speed may be obtained and the parts locked in engagement for each of the several speeds.

The purpose of the device is to improve upon transmission mechanism of this class so that a number of different speeds may be obtained without the necessity of running from one into the other, and to thus produce what may be termed a selective type of transmission mechanism; to provide in connection therewith an improved form of clutch that may also be made to act as a brake when the gears are out of mesh; to so construct and arrange the operative parts, that the several levers may be each made to serve several purposes and whereby the speed shifting levers cannot be operated until the clutch has been disengaged and the shifting rods simultaneously unlocked; and further to generally improve upon and simplify the construction of mechanisms of this sort so as to better adapt it for use upon certain classes of power driven machines.

This transmission mechanism is particularly designed for use in connection with machine tools, such for instance as boring mills, lathes, maxi-mills, &c., but obviously can be used to advantage upon other styles of machines and therefore is not restricted in its application or to its detail of construction.

Upon the accompanying four sheets of drawings forming a part of this specification, similar characters of reference will be found to designate like or corresponding parts throughout the several figures, and upon which, Figure 1, shows a side elevation of my improved primary sliding gear speed changing device with inclosing case for same, the operating levers being shown broken off. Fig. 2, is a longitudinal central vertical section, taken on the plane of the driven shafts, and indicated by 2—2 in Fig. 5. Figs. 3 and 4 show detached side views of the friction disks 33 and 40 shown in Fig. 2. Fig. 5, is an end view as seen from the right of Fig. 1 the end of clutch face 14 being broken away. Fig. 6, is a detached front view of the double guide plate through which the two operating levers 66 and 67 are operated. Figs. 7 and 8, show detail sectional elevations of one of the pair of slide rods 62 and 63, locking devices and operating levers for same. Fig. 9, shows a sectional plan view, taken on line 9—9 of Fig. 1, illustrating the operating levers, slide rods and connected parts. Fig. 10, shows a detail cross sectional view illustrating the operative connections of the slide rods with sliding gears, and, Fig. 11, shows a sectional plan view through the secondary transmission mechanism that I connect with the primary and operate by levers attached thereto.

Referring in detail to the characters of reference marked upon the drawings 12 represents a gear casing which is shown bolted to a part of the machine frame 13. This casing includes an extension for the clutch mechanism, that is inclosed by a cap 14 and is in line with the main or lower shaft 15. 16 represents the end of a driven shaft that is coupled to the main shaft 15 mounted to turn in suitable bearings 17—17 of the tubular shaft 18 that is journaled in bearings 19—19 of the casing. Upon the outer end of the shaft 15 is secured an outer gear 20 that serves to drive the gear connections 21 for pump 22 which is used to lubricate the transmission mechanism but which forms no material part of the invention.

To the tubular shaft 18 is keyed two pairs of sliding gears 23 and 24 of different sizes. These gears serve to engage other gears on a driven shaft 25 for the purpose of transmitting different speeds thereto, as for instance the larger gear of pair 24 is designed to be engaged with the gear 26 upon the shaft 25 while the smaller gear of the same pair may be made to engage the gear 27 which is slightly larger than the gear 26. The largest of the pair of gears 23 is in a like manner designed to engage the larger gear 28 while the smaller gear of the pair 23 is arranged to be thrown into engagement with the largest gear 29. The gears, 26, 27, 28 and 29 are all secured to the shaft 25 and turn with it and its connected shaft 30 at different speeds, governed by the speed of the shaft 18 and the particular one of the sliding gears which may be thrown into mesh with that of the connectible gear on the shaft 25.

The driving connections between the shafts 15 and 18 are made through a clutch and brake mechanism shown at the right in Fig. 2 and comprise a spool 31 that is secured to the shaft 15 by means of a key 32. A series of disks 33 are mounted to turn with, but are permitted to slide longitudinally upon this spool by means of keys 34 that are secured to the periphery of the spool and loosely engage the notches 35 in the hole of the disk so as to insure the said disk's turning with the spool as before stated allowing endwise movement thereof upon said spool. A sleeve 36 is secured to the tubular shaft 18 and projects forward to cover the said disks upon the spool and form a friction cone 37. This sleeve is provided with a pair of keys 38 that freely engage notches 39 in the disks 40 which are alternately arranged intermediate of the before mentioned disks 33. These disks 40 carried by the sleeve, like the disks 33 upon the spool, are free to move longitudinally, but are rotated with the said sleeve. Said disks are thus susceptible of being compressed together so that their sides engage each other and form a friction driving connection which is very effective and capable of carrying a heavy load. The means for compressing these friction disks to form the driving connection between the shafts 15 and 18 is in part, a toggle construction, and consists of a plate 41 that is slidably mounted upon the spool 31 and keys 34 and has secured to its outer face a series of studs 42 that are engaged at proper times by the shoulders 43 of levers 44. One end of these levers is pivotally connected to a collar 45 also secured to the spool and which is held against longitudinal movement by the nut 46 threadably attached to the end of the said spool. A sleeve 47 is slidably mounted upon the end of the shaft 15 adjacent to the spool 31 and is secured to turn therewith by reason of its engagement with the before mentioned key 32 in said shaft 15 so that the sleeve, spool, toggle and connected parts are at all times in alinement with each other. The outer end of each lever 44 is pivotally connected to the inner or enlarged end of the sleeve 47 through the medium of short links 48 so that when the sleeve is shoved out toward the end of the cap 14 the said links and connected ends of the levers will be thrown out and the shoulders 43 of the levers brought to bear upon the studs 42 in a way to press the plate 41 in to engage the disks.

Upon the outer end portion of the sleeve is mounted a hub 49 that is keyed to the sleeve and is further held against endwise movement by the nuts 50 attached to the sleeve. This hub is provided with an annular groove 51 in which shoes attached to the forked ends 53 of an operating lever 54 operate. A housing 55 is formed integral with this hub to inclose the toggle mechanism and form an integral friction surface 56 to engage a corresponding beveled friction surface 37 of the before mentioned sleeve member 36. A key 57 slidably connects the housing with the gear case 12 so as to further prevent the turning of the said housing, but permits the same to be moved longitudinally therein. It will thus be seen that with the inward thrust of the hub 49, its connected cone friction surface will engage that of the sleeve secured to the shaft in a way to form a resistance against the turning of the latter and thereby form a brake to stop the mechanism if necessary, whereas upon the other hand if it is desired to make a driving connection between the two shafts it would be done by the operation of the same lever in an opposite direction by throwing the hub 49 and its sleeve out, thus manipulating the toggle and its connections. An adjustable stop 58 secured to the cap 14 serves to limit the outward movement of these parts.

The before mentioned lever 54 is pivotally connected to a bracket 59 of the clutch case and is not only designed to operate the clutches and brake cones before mentioned, but in addition is provided with an outwardly extended arm 60 (see Figs. 1 and 5) that engages notches 61 in the several slidable rods 62 and 63 for the primary transmission mechanism, and rods 64 and 65 for operating the secondary transmission mechanism shown in Fig. 11. The construction and purpose of this interlocking device is to prevent movement of the sliding gears of these transmission mechanisms when the clutch disks are in engagement as will later be more fully explained. All four of these slide rods 62, 63, 64 and 65 are mounted in the gear casing 12 and are adapted to be slid backward and forward by the levers 66 and 67 pivotally mounted upon a stud 68 carried upon a bracket 69 which is also formed upon the side of the gear casing 12. The lower lever 66, its rods 62 and 63 are similar in all respects to the upper set, including lever 67 and rods 64 and 65, and are designed to be connected to operate the sliding gears of a second transmission mechanism shown in Fig. 11 and which I employ in connection with the primary transmission mechanism. This primary transmission mechanism as illustrated in Figs. 1 to 10 inclusive, is susceptible of developing four different speeds as between the shafts 18 and 25 while the secondary transmission mechanism is susceptible of producing three, thus making twelve speeds in all that can be obtained with the two devices combined. The rods 62—65 are each provided with a series of notches 61 for the engagement of the arm 60 of the lever 54 in the manner herebefore described. These two pairs of rods are also each provided with a notch or pocket 70 in their adjoining inner face for the engagement of the end of the levers 66 and 67 to shove the rods backward and forward.

An arm 71 is connected to the upper rod 62 of the lower pair and engages an annular groove in the gear 24, while a second arm 72 is secured to the lower rod 63 for engagement with a groove of the second pair of sliding gears 23 so that any movement of the rods is imparted to the gears to throw them in or out of mesh with their driven gears on the shaft 25. The normal positions of these rods and sliding gears are indicated in Fig. 2 of the drawings; thus a movement of either rod in one direction would put the gear in mesh with one of the driven gears while a movement in the opposite direction would put it in mesh with the adjoining gear. This movement has necessarily got to be such as to cause the gears to fully register one with the other; otherwise the notches 61 referred to would not register with the arm 60 and the same could not be operated to engage the friction disks for the driving of the shafts and gears. The lever 66 is not only pivoted to swing horizontally, but is also susceptible of a vertical movement thus allowing the lower end of the lever to be swung up or down for engagement with the pockets 70 in either rod 62 or 63. The one lever thus serves to operate the two rods it being of course obvious that but one rod could be operated at a time, and that has to be properly returned to a neutral position before the lever can be disengaged and put into engagement with the pocket of the second rod.

I employ a second locking device to further hold the slide rods against any possible endwise movement while the operating levers are disengaged, which is clearly shown in Figs. 5, 7, 8 and 11, and which consists of two buttons 73 that are pivotally mounted upon screws 74 secured to the casing 12 covering the clutch disks. There are two of these buttons one for each pair of rods 62 and 63, and 64 and 65, the construction and operation of each being the same. These buttons are located opposite the ends of the levers 66 and 67 and are operated by the vertical movement of the ends of the said levers as will be readily understood from Figs. 7 and 8. These buttons are each provided with a concave edge 73$^a$ that is engaged by the end of its respective lever and further include an upper end 73$^b$ and a lower end 73$^c$ that serves to engage the oppositely located pocket 70 in the adjoining pairs of rods. The concave edge 73$^a$ of the button is so cut and formed that a vertical movement of the end of the lever will insure a pivotal movement of the button and throw its ends up or down with the said lever to engage the pockets before mentioned. The normal positions of these buttons are such as to engage both of the said rods when the levers 66 and 67 are in an intermediate position as shown in Fig. 5 but is so shaped and proportioned that the upper end engages and locks the upper rod when the lever is down, and likewise to engage the lower rod only when the end of the lever is thrown up as shown in Fig. 7.

The levers 66 and 67 as before stated, are hung to swing in both a vertical and horizontal direction. They are so arranged however, that both of said movements are distinct and separate so as to insure the rods being brought back to their normal position before they can be disengaged by the levers. This means, as will be noted, consists in a guide plate 75 that is secured to the side of the casing 12 and is provided with special forms of slots 76 and 77 through which the inner end of the respective levers 66 and 67 extend to engage the rods. The lower slot 77 includes a central vertical passage with oppositely extended notches in each side edge of both the upper and lower ends, thus permitting the levers to be thrown to either side from the center. The upper slot 76 also provides for a vertical movement of the lever to shift from one rod to the other, and a horizontal movement in both directions when engaging the upper rod 64. It can, however, be operated to the left of the central passage only, when engaging the lower rod 65; therefore the second or upper lever is only susceptible of three movements from the vertical slot which are all that is required to obtain the three changes of speed in the secondary. Each of these speeds thus represent a subdivision of the respective speeds in the primary and thus give the twelve different speeds obtained.

In practice the secondary transmission mechanism as shown in Fig. 11 is arranged at a right angle to the primary. In this connection note the connecting driven shaft 30 coupled to shaft 25 and shown in Figs. 1, 2, and 11. This shaft 30 is journaled in bearings of the secondary transmission mechanism case 78 at a right angle to the other shaft thereof and is provided upon its inner end with a bevel gear 79 that meshes with and drives a double faced gear having outer bevel teeth 80 and inner teeth 81. Said gear is keyed to the tubular shaft 82 that is journaled longitudinally in bearings of the casing 78 and has a gear 83 formed in its outer peripheral surface. This gear meshes with and drives a larger gear 84 upon a second longitudinal shaft 85 also journaled in the case. The opposite end and intermediate portions of this last named shaft also has keyed thereon gears 86 and 87 which serve to be engaged by the sliding gears 88 and 89 respectively, upon a longitudinal shaft 90 journaled in the casing and the before mentioned tubular shaft 82. The sliding gear 88 is normally located between the before mentioned internal gear 81 and said gear 86 and is adapted to be operated upon its shaft 90 in either direction to engage either of said gears 81 and 86 to form distinct driving connections and to produce different speeds. The connection between the slide rods 64 and 65 and the sliding gears 88 and 89 is formed through bell crank levers 91 and 92, pivotally connected to a bracket of the casing as seen in Fig. 11. The lever 67 and upper rod 64 and bell crank lever 91 serve to operate the double acting sliding gear 88, while the same lever 67, lower rod 65 and second bell crank lever 92 serve to operate the second sliding gear 89.

Having thus described my invention what I claim and desire to secure by Letters Patent is:

1. In a speed changing device the combination with two trains of changeable speed gears connected together, the second one of which is adapted to produce a number of speeds for each speed of the first train, a pair of slide rods for operating each train to produce different speeds and a locking lever adapted to be engaged with and disengaged from said rods to hold the gears in mesh.

2. In a speed changing device, the combination of two trains of gears including two sliding gears, a slide rod for operating each sliding gear, a single lever for operating either of said rods, and a pivotal locking button arranged to engage the said slide rods and adapted to be engaged and operated by the lever to unlock the particular rod desired to be operated.

3. In a speed changing device, the combination of two trains of gears including two sliding gears, a slide rod for operating each sliding gear, a pivotal lever adapted to engage either rod for operating the same, a locking device arranged to engage either or both of the said rods and adapted to be operated by the movement of the lever so as to unlock the particular rod desired to be operated, and a second lever also designed to lock the said rods.

4. In a speed changing device, the combination of two trains of gears including two or more sliding gears, slide rods for operating said sliding gears, levers for operating either of the said rods, locking devices arranged to engage either of the said rods and adapted to be operated by the movement of the levers so as to unlock the particular rod desired to be operated, and further means to lock the said rods and to prevent the shifting of one of the sliding gears while the other is being changed.

5. In a speed changing device, the combination with two trains of changeable speed gearing connected together, the second one of which is adapted to produce a number of speeds for each speed of the first train, means for adjusting the gears and operating them jointly to produce a number of speeds, slide rods and levers for operating the two trains, a disk clutch mechanism through which the gearings are operated, and a lever for operating the clutch mechanism and to lock the rods.

6. In a speed changing mechanism, the combination with a driven shaft, fixed gears thereon, a hollow shaft, pairs of sliding gears upon the hollow shaft to engage the fixed gears upon the driven shaft, a driving shaft within the hollow shaft, slide rods to operate the sliding gears, an operating lever connected with said rod, a series of friction disks arranged between the driving and hollow shafts, and a lever to operate the said disks to engage the two shafts.

7. In a speed changing mechanism, the combination with a driven shaft, fixed gears thereon, a hollow shaft, sliding gears upon the hollow shaft to engage the fixed gears upon the driven shaft, a driving shaft within the hollow shaft, a sliding rod to operate the sliding gears, an operating lever connected with the said rod, a series of friction disks arranged between the driving and hollow shafts, a lever to operate the said disks to engage the two shafts, a friction cone between the hollow shaft and casing, and a lever for operating both said disks and cone.

8. In a speed changing mechanism, the combination with a driven shaft, fixed gears thereon, a driving shaft, two pairs of sliding gears to engage the gears upon the driven shaft, a pair of slide rods to operate the sliding gears and having pockets therein, a pivoted operating lever adapted to engage with the pockets of either of said rods, and buttons adapted to be engaged by the lever to lock the rods in position.

9. In a speed changing mechanism, the combination with a driven shaft, fixed gears thereon, a driving shaft, sliding gears to engage the gears upon the driven shaft, a pair of sliding rods to operate the sliding gears and having pockets therein, an operating lever adapted to engage either of the said pockets in said rods, and buttons engaged by the lever to lock the rods disengaged from the lever.

10. In a speed changing device of the class described, the combination with a casing, a driving and a driven shaft, of a sleeve carried upon each shaft, a series of disks keyed to and slidable upon each of said sleeves, a second driven shaft, sliding gears upon the first mentioned driven shaft, gears upon the second mentioned driven shaft to be engaged by the sliding gears, a sliding rod to operate the sliding gears and having notches therein, an operating lever connected with said rod, friction cones arranged between the driving shaft and casing, and a lever to operate the disks and cones and having an arm to engage the said notches to prevent movement of the rod.

11. In a speed changing mechanism, the combination with a driven shaft, a pair of fixed gears thereon, a driving shaft, a pair of sliding gears to engage the fixed gears upon the driven shaft, a sliding rod to operate each of the sliding gears and having notches therein, an operating lever adapted to be connected with either of said rods for shifting the sliding gears, and a locking lever to engage the said notches to prevent a movement of the rods.

12. In a speed changing mechanism, the combination with a driven shaft, fixed gears thereon, a driving shaft, a sliding gear upon the driving shaft to engage either of the gears upon the driven shaft, a sliding rod to operate the sliding gear and having notches therein, an operating lever connected with said rod, a slotted guide plate through which the lever extends, and a locking lever to engage said notches to prevent a movement of the rod.

13. In a speed changing mechanism, the combination with a driven shaft, fixed gears thereon, a driving shaft, two pairs of sliding gears upon the driving shaft to engage the fixed gears upon the driven shaft, a pair of sliding rods to operate the sliding gears and having notches therein, a pivoted operating lever adapted to be engaged by either of said rods, and a locking lever to engage the notches in both rods to prevent a movement of either of the rods.

14. In a speed changing mechanism, the combination with a driven shaft, fixed gears thereon, a driving shaft, a sliding gear upon the driving shaft to engage the fixed gears upon the driven shaft, a sliding rod to operate the sliding gear and having pockets and notches therein, an operating lever adapted to engage the said pockets in said rod, and a locking lever to engage the said notches to prevent a movement of the rod.

15. In a speed changing mechanism, the combination with a driven shaft, fixed gears thereon, a driving shaft, a sliding gear upon the driving shaft to engage the fixed gears upon the driven shaft, a sliding rod to operate the sliding gear, an operating lever connected with the said rod, a main driving shaft, a series of friction disks arranged between the main driving shaft and the driving shaft having the sliding gears mounted thereon, and a lever to operate the disks and engage the rod to prevent the movement of the latter.

16. In a speed changing mechanism, the combination with a casing, a driven shaft, fixed gears thereon, a driving shaft, a sliding gear mounted thereon, a main driving shaft, a sliding rod to operate the sliding gear, an operating lever connected with said rod, a series of friction disks arranged between the main driving shaft, and the driving shaft having the sliding gears mounted thereon, friction cones arranged between the driving shaft and casing, and a lever to operate the disks and cones and to prevent movement of the rod.

17. In a speed changing mechanism, the combination with a casing, a driven shaft, fixed gears thereon, a driving shaft, a sliding gear upon the driving shaft to engage the fixed gears upon the driven shaft, a main driving shaft, a sliding rod to operate the sliding gear and having notches therein, an operating lever connected with said rod, a series of friction disks arranged between the main driving shaft and the driving shaft having the sliding gears mounted thereon, friction cones arranged between the shaft and casing, and a lever to operate the disks and cones and having an arm to engage the said notches to prevent movement of the rod.

Signed at Bridgeport, in the county of Fairfield and State of Connecticut this 20th day of December, A. D. 1911.

EDWARD P. BULLARD, Jr.

Witnesses:
C. M. Newman,
G. N. Morehouse.